US009300897B2

(12) United States Patent
Oh

(10) Patent No.: US 9,300,897 B2
(45) Date of Patent: Mar. 29, 2016

(54) SINK APPARATUS, SOURCE APPARATUS, FUNCTION BLOCK CONTROL SYSTEM, SINK APPARATUS CONTROL METHOD, SOURCE APPARATUS CONTROL METHOD AND FUNCTION BLOCK CONTROL METHOD

(71) Applicant: SAMSUNG ELECTRONICS CO., LTD., Suwon-si (KR)

(72) Inventor: Sung-bo Oh, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 14/158,371

(22) Filed: Jan. 17, 2014

(65) Prior Publication Data

US 2014/0211097 A1 Jul. 31, 2014

(30) Foreign Application Priority Data

Jan. 31, 2013 (KR) .......................... 10-2013-0011344

(51) Int. Cl.
*H04N 5/63* (2006.01)
*H04N 5/775* (2006.01)
(Continued)

(52) U.S. Cl.
CPC .................. *H04N 5/63* (2013.01); *H04N 5/775* (2013.01); *H04N 21/43622* (2013.01); *H04N 21/4436* (2013.01)

(58) Field of Classification Search
CPC ....................................................... H04N 5/63
USPC ........... 348/730, 725, 552, 553; 370/476, 522
See application file for complete search history.

(56) References Cited

U.S. PATENT DOCUMENTS

| 7,088,398 B1 * | 8/2006 | Wolf et al. ................. 348/423.1 |
| 7,184,000 B2 * | 2/2007 | Itakura ........................... 345/3.1 |
| 7,983,304 B2 * | 7/2011 | Tatsuta et al. ................. 370/476 |

(Continued)

FOREIGN PATENT DOCUMENTS

| EP | 2 234 396 A1 | 9/2010 |
| JP | 2008-145679 A | 6/2008 |

(Continued)

OTHER PUBLICATIONS

Communication from the European Patent Office issued May 14, 2014 in a counterpart European Application No. 14153186.3.

(Continued)

*Primary Examiner* — Paulos M Natnael
(74) *Attorney, Agent, or Firm* — Sughrue Mion, PLLC

(57) ABSTRACT

A sink apparatus, a source apparatus, a function block control system incorporating the sink and source, and related methods are provided. The source apparatus may be configured to analyze specification information related to and from the sink apparatus, generate a function block control signal for the sink apparatus based on the analyzed specification information and output properties of content to be transmitted, and transmit the generated function block control signal and the content to the sink apparatus. The sink apparatus may be configured to receive the function block control signal and content from the source apparatus, selectively turn on or off at least one function block from a plurality of function blocks according to the received function block control signal, and output the received content using at least one of the plurality of function blocks that remain on.

23 Claims, 11 Drawing Sheets

(51) Int. Cl.
*H04N 21/436* (2011.01)
*H04N 21/443* (2011.01)

(56) References Cited

U.S. PATENT DOCUMENTS

| | | | |
|---|---|---|---|
| 8,082,455 B2 | 12/2011 | Reams | |
| 8,300,154 B2 | 10/2012 | Hirono et al. | |
| 8,659,400 B2 * | 2/2014 | Arling et al. | 340/12.29 |
| 8,713,598 B2 * | 4/2014 | Nakajima et al. | 725/32 |
| 2001/0020193 A1 | 9/2001 | Teramachi et al. | |
| 2003/0053548 A1 * | 3/2003 | Lee et al. | 375/259 |
| 2004/0080671 A1 * | 4/2004 | Siemens et al. | 348/473 |
| 2009/0046993 A1 * | 2/2009 | Nishio | 386/96 |
| 2009/0249086 A1 | 10/2009 | Reams | |
| 2010/0132004 A1 | 5/2010 | Ota et al. | |
| 2010/0225813 A1 | 9/2010 | Hirono et al. | |
| 2012/0026726 A1 * | 2/2012 | Recker et al. | 362/157 |
| 2012/0069154 A1 * | 3/2012 | Talstra et al. | 348/51 |

FOREIGN PATENT DOCUMENTS

| | | |
|---|---|---|
| JP | 2010-114895 A | 5/2010 |
| JP | 2010-206441 A | 9/2010 |
| KR | 10-0669011 B1 | 1/2007 |
| KR | 10-2009-0032771 A | 4/2009 |
| KR | 10-2010-0124842 A | 11/2010 |

OTHER PUBLICATIONS

Communication dated Apr. 28, 2015, issued by the European Patent Office in counterpart European Application No. 14153186.3.

* cited by examiner

| 0 | 0 | 0 | 0 | 0 | 0 | 1 | 0 |
|---|---|---|---|---|---|---|---|
| Reserved | 3D FUNCTION UNIT | ANALOG INPUT FUNCTION UNIT | ETHERNET INPUT FUNCTION UNIT | USB FUNCTION UNIT | WIFI FUNCTION UNIT | AUDIO FUNCTION UNIT | VIDEO FUNCTION UNIT |

<u>700</u>

800

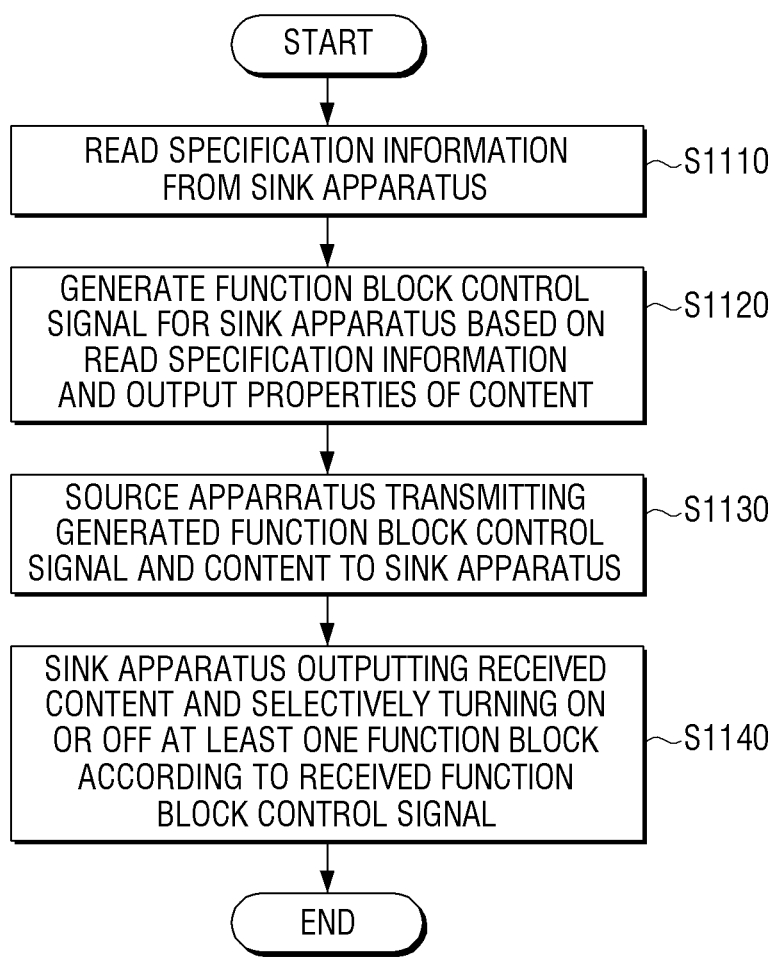

SINK APPARATUS, SOURCE APPARATUS, FUNCTION BLOCK CONTROL SYSTEM, SINK APPARATUS CONTROL METHOD, SOURCE APPARATUS CONTROL METHOD AND FUNCTION BLOCK CONTROL METHOD

CROSS-REFERENCE TO RELATED APPLICATIONS

This application claims priority from Korean Patent Application No. 10-2013-0011344, filed on Jan. 31, 2013 in the Korean Intellectual Property Office, the contents of which are incorporated herein by reference in its entirety.

BACKGROUND

1. Field

Apparatuses and methods consistent with exemplary embodiments relate to a function block control method of a sink apparatus, and more particularly to a sink apparatus for a function block control, a source apparatus, a function block control system, a sink apparatus control method, a source apparatus control system and a function block control method.

2. Description of the Related Art

As multimedia technology has been developed, a convergence of digital features has been realized by certain multimedia devices. For example, electronic devices such as televisions (TV) may provide various functions such as Internet access, cameras, video playback and creation, MP3 playback, and telephones capabilities as well as an ability to broadcast output. Accordingly, electronic devices may be designed such that they provide as a plurality of function blocks for performing the various digital functions. For example, a digital TV has progressed to a state wherein a person of ordinary skill may call the digital TV a smart TV that includes various function blocks, or modules. For example, the smart TV may have a Bluetooth module for a local area communication. Additionally, the smart TV may have a wired interface module for receiving and transmitting data from and to an external device such as High-Definition Multimedia Interface, (HDMI) a microphone for voice recognition, as well as a network communication port used for connecting to the Internet.

As the configurations of hardware and software of an electronic device have increased in complexity to provide various functions, the power consumption required for the electronic device has also increased. In particular, an increase in the usage can be noticed when a function block is running, and when that function block is currently not being used by a user, and remains in in a running state in the electronic device, there is a noted power consumption that continues. FIG. 1 below describes this state.

FIG. 1 is a view of a source-sink system 100 which illustrates an operation between a related art Blu-ray disk player (BDP) 110 and a digital TV 120.

Referring to FIG. 1, the Blu-ray disk player (BDP) 110 may transmit an audio file in MPEG-1 or MPEG-2 Audio Layer III, more commonly referred to as MP3 format to the TV 120. The TV 120 outputs the audio file and at a similar time outputs an image. The image may or may not be related to the audio file. For example, when a user operates the TV only to listen to music, the image display function block of the TV is still activated and an image is still output as illustrated in FIG. 1. In this case, additional power beyond that necessary for music playback is consumed because the system cannot determine the operation state and therefore cannot reduce the power consumption.

SUMMARY

One or more exemplary embodiments provide a sink apparatus that may effectively reduce power consumption of an electronic apparatus by selectively turning off a function block according to the output content provided by a source apparatus, a source apparatus, a function block control system, a sink apparatus control method, a source apparatus control method, and a function block control method.

According to an aspect of an exemplary embodiment, there is provided a sink apparatus including a transceiver configured to transmit specification information related to the sink apparatus to a source apparatus, and receive, from the source apparatus, content and a function block control signal; a controller configured to selectively turn on or off at least one function block from among a plurality of function blocks of the sink apparatus according to the received function block control signal; and an output unit configured to output the received content using at least one of the plurality of function blocks that remain on.

The specification information related to the sink apparatus may include information related to the at least one function block of the sink apparatus.

The specification information may be transmitted by being included in extended display identification data (EDID).

The at least one function block may be at least one of a Wi-Fi function block, a USB function block, an input function block, an analog input function block, an Ethernet input function block, an audio function block, a video function block and a three-dimensional (3D) function block.

According to an aspect of an exemplary embodiment, there is provided a source apparatus including: a transceiver configured to receive specification information related to the sink apparatus and transmit, to the sink apparatus, content and a function block control signal; and a control signal generator configured to generate the function block control signal related to the sink apparatus based on the received specification information and output properties of the contents; and a controller configured to control the transceiver to transmit the generated function block control signal to the sink apparatus.

The function block control signal may be included in a source product descriptor (SPD) info-frame.

The function block control signal may be transmitted to the sink apparatus by being synchronized with the contents.

The function block control signal may include a control signal turning off a video function block in response to the transmitted content being audio content.

According to an aspect of an exemplary embodiment, there is provided a function block control system including: a source apparatus configured to generate a function block control signal based on specification information received from a sink apparatus and output properties of content to be transmitted, and transmit the generated function block control signal and the content to the sink apparatus; and a sink apparatus configured to receive the function block control signal and content from the source apparatus, selectively turn on or off at least one function block from among a plurality of function blocks of the sink apparatus according to the received function block control signal, and output the received content using at least one of the plurality of function blocks that remain on.

The function block control system may be based on a HDMI transmission standard.

According to an aspect of an exemplary embodiment, there is provided a method for controlling a sink apparatus, the method including: transmitting specification information related to the sink apparatus to a source apparatus; receiving content and a function block control signal; selectively turning on or off at least one function block among a plurality of function blocks of the sink apparatus according to the received function block control signal; and outputting the received content using at least one of the plurality of function blocks that remain on; and.

The specification information related to the sink apparatus may include information related to the at least one function block of the sink apparatus.

The specification information may be transmitted by being included in extended display identification data (EDID).

The at least one function block may be at least one of a Wi-Fi function block, a USB function block, an input function block, an analog input function block, an Ethernet input function block, an audio function block, a video function block, and a 3D function block.

According to an aspect of an exemplary embodiment, there is provided a method for controlling a source apparatus, the method including: analyzing specification information related to and received from a sink apparatus; generating a function block control signal for the sink apparatus based on the analyzed specification information and output properties of the content; and transmitting the content and the generated function block control signal to the sink apparatus.

The function block control signal may be included in a source product descriptor (SPD) info-frame.

The function block control signal may be transmitted to the sink apparatus by being synchronized with the contents.

The function block control signal may include a control signal turning off a video function block in response to the transmitted content being audio content.

According to an aspect of an exemplary embodiment, there is provided a method for controlling a function block, the method including: analyzing, by a source apparatus, specification information related to and from a sink apparatus; generating, by the source apparatus, a function block control signal for the sink apparatus based on the analyzed specification information and output properties of the content; transmitting, by the source apparatus, the generated function block control signal and the content to the sink apparatus; and outputting, by the sink apparatus, the received content and selectively turning on or off at least one function block according to the received function block control signal.

The function block control method may be based on at least one of a HDMI transmission standard, a DVI transmission standard, and a MHL transmission standard.

According to the one of more of the above exemplary embodiments the sink apparatus may selectively turns off a function block according to the output of the content provided from the source apparatus so that power consumption of an electronic apparatus may be efficiently reduced.

BRIEF DESCRIPTION OF THE DRAWINGS

The above and/or other aspects will become apparent and more readily appreciated from the following description of exemplary embodiments, with reference to the accompanying drawings of which:

FIG. 5 is a table illustrating an on/off state of function blocks according to an exemplary embodiment;

FIG. 11 is a flowchart illustrating a function block control method according to various exemplary embodiments.

DETAILED DESCRIPTION OF EXEMPLARY EMBODIMENTS

Figure 1:
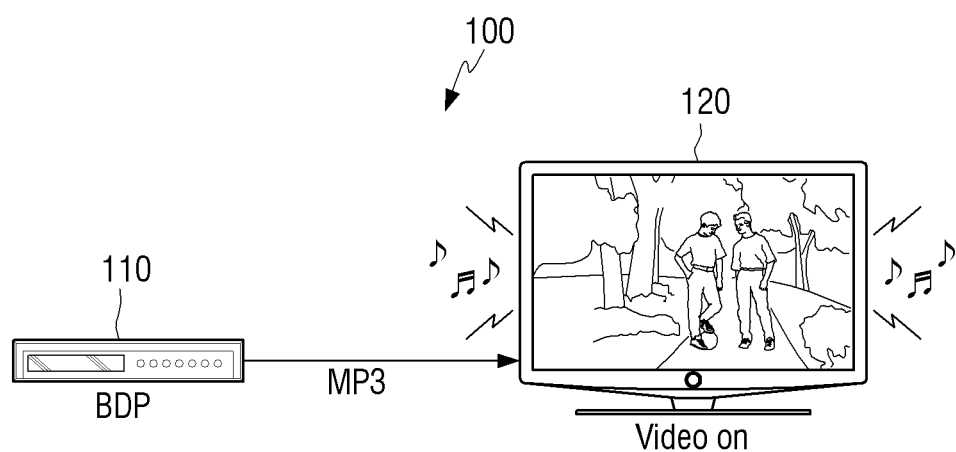
FIG. 1 is a schematic diagram of a source-sink system illustrating an operation between a related art Blu-ray disk (BDP) player and a digital TV.

Reference will now be made in detail to exemplary embodiments of, examples of which are illustrated in the accompanying drawings, wherein like reference numerals refer to the like elements throughout. T The following detailed description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. The progression of processing steps and/or operations described is an example; however, the sequence of and/or operations is not limited to that set forth herein and may be changed as is known in the art, with the exception of steps and/or operations necessarily occurring in a particular order. In addition, respective descriptions of well-known functions and constructions may be omitted for increased clarity and conciseness.

Additionally, exemplary embodiments will now be described more fully hereinafter with reference to the accompanying drawings. The exemplary embodiments may, however, be embodied in many different forms and should not be construed as being limited to the embodiments set forth herein. These embodiments are provided so that this disclosure will be thorough and complete and will fully convey the exemplary embodiments to those of ordinary skill in the art. The scope is defined not by the detailed description but by the appended claims. Like numerals denote like elements throughout.

The term ". . . unit" used in the embodiments indicates a component including software or hardware, such as a Field Programmable Gate Array (FPGA) or an Application-Specific Integrated Circuit (ASIC), and the ". . . unit" performs certain roles. However, the ". . . unit" is not limited to software or hardware. The ". . . unit" may be configured to be included in an addressable storage medium or to reproduce one or more processors. Therefore, for example, the ". . . unit" includes components, such as software components, object-oriented software components, class components, and task components, processes, functions, attributes, procedures, subroutines, segments of program code, drivers, firmware, microcode, circuits, data, a database, data structures, tables, arrays, and variables. A function provided inside components and ". . . units" may be combined into a smaller number of components and ". . . units", or further divided into additional components and ". . . units".

The term "module" as used herein means, but is not limited to, a software or hardware component, such as an FPGA or ASIC, which performs certain tasks. A module may advantageously be configured to reside on an addressable storage medium and configured to execute on one or more processors. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules may be combined into fewer components and modules or further separated into additional components and modules.

Although the terms used herein are generic terms which are currently widely used and are selected by taking into consideration functions thereof, the meanings of the terms may vary according to the intentions of persons skilled in the art, legal precedents, or the emergence of new technologies. Furthermore, some specific terms may be randomly selected by the applicant, in which case the meanings of the terms may be specifically defined in the description of the exemplary embodiment. Thus, the terms should be defined not by simple appellations thereof but based on the meanings thereof and the context of the description of the exemplary embodiment. As used herein, expressions such as "at least one of," when preceding a list of elements, modify the entire list of elements and do not modify the individual elements of the list.

It will be understood that when the terms "includes," "comprises," "including," and/or "comprising," when used in this specification, specify the presence of stated elements and/or components, but do not preclude the presence or addition of one or more elements and/or components thereof. As used herein, the term "module" refers to a unit that can perform at least one function or operation and may be implemented utilizing any form of hardware, software, or a combination thereof.

Figure 2:
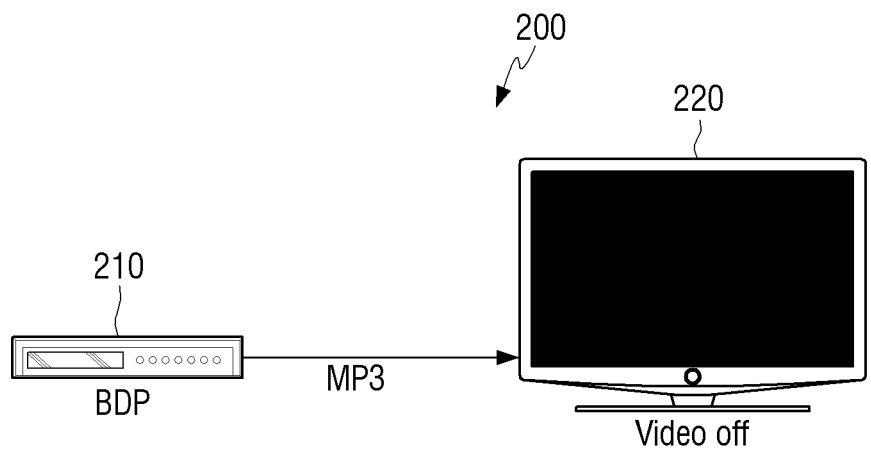
FIG. 2 is a schematic diagram of a source-sink system illustrating an operation state between a BDP, which is a source apparatus, and a TV, which is a sink apparatus, according to various exemplary embodiments.

FIG. 2 is a schematic diagram of a source-sink system 200 illustrating an operation state between a BDP 210, which is a source apparatus, and a TV 220, which is a sink apparatus, according to various exemplary embodiments.

In FIG. 2, a Blu-ray disk player (BDP) 210 transmits an audio file in an MP3 format to a TV 220. The TV 220 outputs the audio file in response to the received audio file and associated function block control signal. Further, the TV 220 turns off an image display function block, and therefore the image display portion of the TV 220 is turned off, in response to not having received any image display function block control signal because the configuration for displaying an image is not needed by the user when only requesting music playback. Accordingly, the power for the hardware components related to the image display portion is cut off or an input current amount is reduced, and the related display job is removed from the job pool.

In accordance with one or more exemplary embodiments, the source apparatus and the sink apparatus may be integrated into a single unit. For example, the Blu-ray player, or other source apparatus, may be included as part of the same electronic housing as the TV, or other sink apparatus.

Figure 3:
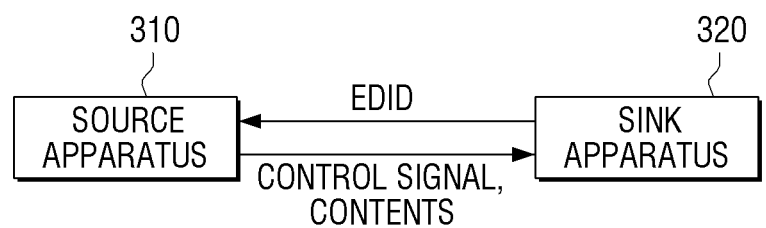
FIG. 3 is a block diagram illustrating a function block control system according to an exemplary embodiment.

FIG. 3 is a block diagram illustrating a function block control system 300 according to an exemplary embodiment.

Referring to FIG. 3, the function block control system 300 according to an exemplary embodiment may include a source apparatus 310 and a sink apparatus 320.

The source apparatus 310 reads and analyzes specification information from the sink apparatus 320 and generates a function block control signal for the sink apparatus 320 based on the analyzed specification information and the output property of the contents to be transmitted to the sink apparatus 320. The specification information from the sink apparatus may be Extended display identification data (EDID). The source apparatus 310 transmits the generated function block control signal and the contents to the sink apparatus 320.

The function block may be at least one of a Wi-Fi function block, a Universal Serial Bus (USB) function block, an input function block, an analog input function block, an Ethernet input function block, an audio function block, a video function block, a 3D function block, a Global Positioning System (GPS) function block, function blocks regarding various kinds of sensors (a proximity sensor, a touch sensor, a pressure sensor, etc.), a Digital Multimedia Broadcasting (DMB) function block, a Bluetooth function block, and an Near field communication (NFC) function block.

The source apparatus 310 may include all kinds of apparatuses capable of generating and transmitting a high speed wired or wireless interface transmission signal. For example, the source apparatus 310 may be implemented as various apparatuses such as at least one of, or combination of, a computer, DVD player, TV, mobile phone, PDA, laptop computer, monitor, tablet PC, electronic book, electronic frame, kiosk, Blu-ray disk, and set-top boxes.

According to an exemplary embodiment, the sink apparatus 320 receives the function block signal and contents from the source apparatus 310, outputs the received contents, and turns on or off at least one function block according to the received function block control signal.

The sink apparatus 320 may include all kinds of apparatuses capable of receiving and playing back a high speed wired or wireless interface transmission signal from the source apparatus 310. For example, the sink apparatus 310 may be implemented as various apparatuses such as at least one of, or combination of, a computer, DVD player, TV, mobile phone, PDA, laptop computer, monitor, tablet PC, electronic book, electronic frame, and kiosk.

The high speed wired interface may be an interface capable of receiving and transmitting data at a high speed, and may include at least one of a high definition multimedia interface (HDMI), a digital video/visual interface (DVI) and a mobile high-definition link (MHL). The HDMI wired interface is a digital video/audio interface standard with an incompressible scheme. The MHL, which is an interface standard which is similar to the HDMI, is a high speed wired interface standard for connecting a mobile device and a TV. The DVI is a wired interface standard which digitalizes and transmits a video image. Such standards provide protocols which are able to provide a high capacity for transmitting data at a high speed between a multimedia source such as a smart phone, a set-top box, a DVD player and a sink apparatus such as an AV device, a monitor and a digital television. Various exemplary embodiments may be implemented in accordance with the wired interface standard.

Further, the configuration and the operation of at least one or more exemplary embodiments of a source apparatus will be explained hereinafter.

Figure 4:
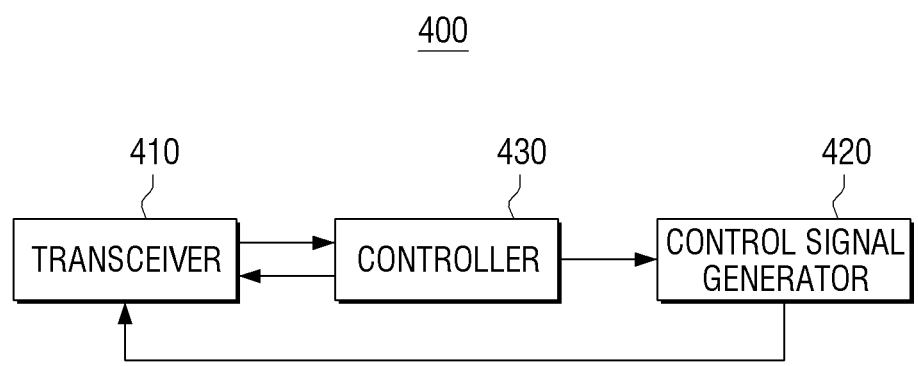
FIG. 4 is a block diagram illustrating a source apparatus according to an exemplary embodiment.

FIG. 4 is a block diagram illustrating a source apparatus 400 according to an exemplary embodiment, and FIG. 5 is a table illustrating an on/off state of function blocks.

Referring to FIG. 4, the source apparatus 400, according to an exemplary embodiment, may include a transceiver 410, a control signal generator 420, a controller 430, and a function block.

The source apparatus 400 may read and analyze specification information from the sink apparatus received through the transceiver 410. When the source apparatus 400 is physically connected to a sink apparatus, e.g., the sink apparatus 120, 220, 320, 700, or 800 from FIGS. 1, 2, 3, 7, and 8, respectively, the sink apparatus may supply a voltage of 2.4V or more through a Hot-Plug-Detect pin (HPD) to the source apparatus 400. The sink apparatus may perform an initialization (reset) and the source apparatus 400 may analyze specification information of the sink apparatus. This initialization process may include an equalizing signal adjustment process. In an exemplary embodiment, the specification information may be included in an extended display identification data (EDID) block or a vendor-specific data block (VSDB) of the sink apparatus. Alternatively, a new data block may also be defined and used.

The transceiver 410 transmits content to the sink apparatus. The content may include various kinds of content such as audio content, 3D image content, 2-D image content and game content. Namely, any kinds of content may be included.

Data content may be transmitted using transition minimized differential signaling (TMDS). The TMDS is a data transmission scheme for transmitting images, audio, and other data using one of three modes; "image data period," "data island period," and "control period." In the "image data period," the image data is transmitted. In the "data island period," audio and other data are divided into various packets and transmitted. In the "control period," control signals are transmitted between the "image data period" and the "data island period."

The data content may be transmitted starting from the time when the data enable signal is allowed, and may be transmitted by being encoded using a high-bandwidth digital content protection technology. In addition, the data content may be synchronized with a function block control signal and transmitted to the sink apparatus. The sink apparatus may decode and output the received encoded data content.

The transceiver 410 transmits the function block signal to the sink apparatus.

The control signal generator 420 generates a function block control signal for the sink apparatus based on the analyzed (or received) specification information and the output properties of the content. The specification information may include function blocks of the sink apparatus and information on the control signal for each function block. The output properties of the content may be information which sets out the overall context in which the content is played back. For example, an output property may be any one of the kind (encoding type) of content, playing time, power consumption, information on a function block for playing back content, and whether an operation of another function block is required. For example, in the case of audio content, it may be unnecessary to play back video, and thus it is important to identify that the content is audio signals. Alternatively, even in the case of audio content, if the audio is a sound associated with an image or video signal, it may be requested and thus necessary to output the audio with the image or video signal, and thus a video function block would be operated. In accordance with an exemplary embodiment, if the sink apparatus is a mobile apparatus such as a tablet PC, the sink apparatus may be sensitive to power consumption, and thus the playback time of the content may be considered. If the playback time is relatively short, it may be possible to not turn off some function blocks (for example, a function block, such as Wi-Fi, related to a communication module) essentially required for the sink apparatus. However, if the playback time is relatively long, the battery consumption may increase, and thus turning off some function blocks to avoid the battery consumption during the idle time might be executed.

In an exemplary embodiment, in response to audio signals being transmitted between video signals on, for example an HDMI interface, control of a function block as described above may be executed. Particularly, an audio clock frequency may not be separately transmitted, and the sink apparatus may therefore reproduce an audio clock from the video clock. To this end, a video signal and an audio signal are transmitted together. When the sink apparatus receives the audio signal and the video signal together, the sink apparatus may activate all circuits and backlight related to video output in addition to the audio portions. Accordingly, even if only audio output is required, unnecessary power consumption occurs on the part of the activated video circuits and backlight related areas. Accordingly, a function block control signal to disable a video function block may be transmitted so that the circuits and backlight related video output of the source apparatus is disabled and power consumption may be reduced.

The control signal generator 420 generates a function block control signal that corresponds to the overall state of the outputting content in view of the specification information and the output properties of the content. In an exemplary embodiment, a lookup table for generating the control signal may be established. For example, the control signal generator 420 generates a function block control signal for the sink apparatus by referring to the lookup table based on the specification information and the output properties of the content of the sink apparatus. The function block control signal may include function block identification information, which is controlled by the sink apparatus, and a control signal for the identified function block. The lookup table may be established during the process of producing the source apparatus 400, and the source apparatus 400 may include an interface which can be adjusted by a user after a product is released.

The function block control signal may be transmitted to the sink apparatus by being included in the source product descriptor (SPD) Info-frame. The SPD Info-frame is defined as packet type 0×83 under the HDMI standard. The function block control signal may be transmitted using a certain byte among the SPD Info-frame's 25 bytes.

The aforementioned control signal generator 420 may be embedded in the source apparatus 400 as an IC chip performing the above function, and the IC chip may have mount thereon embedded software. Alternatively, the control signal generator 420 may be included in a storage (not shown) of the source apparatus 400 in the form of a pure software algorithm and perform the aforementioned function according to a control of the controller 430.

The controller 430 controls the operation of the source apparatus 400 and, in particular, controls the control signal generator 420 to generate a function block control signal and the transceiver 410 to transmit the generated function block control signal and the content to the sink apparatus.

The controller 430 may include hardware elements such as a CPU and a cache memory and software elements such as an operating system and an application performing a certain objective. Control instructions regarding each software element for operating the source apparatus 400 according to the system clock are read by the memory, and electric signals are generated to operate each hardware element according to read control instructions.

In the exemplary embodiment of FIG. 2, the BDP 210 reads the EDID data block from the TV 220 and confirms that the TV 220 has an audio function block and a video function block. The BDP 210 may then identify that the content currently being provided to the TV 220 are audio signals which do not require video image playback and may then generate a control instruction to turn off the video function block of the TV 220. The BDP 210 may transmit the control instruction for the function block and content to the TV 220. As a result, and as illustrated in FIG. 5, other function blocks other than the audio function block (function unit) are in an off state (OFF: indicated as 0) and only the audio function block is in an ON state.

Figure 6:
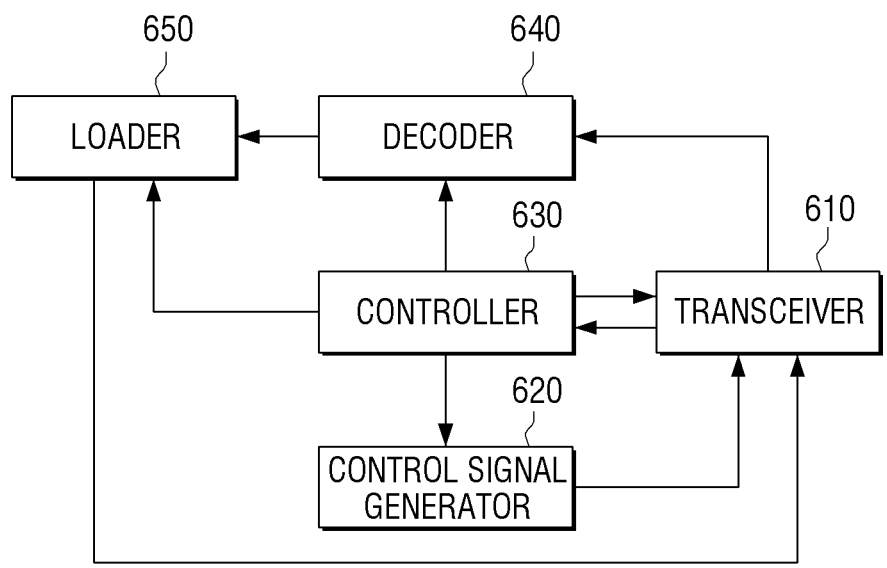
FIG. 6 is a block diagram illustrating a source apparatus adding additional elements to the source apparatus according to an exemplary embodiment.

FIG. 6 is a block diagram of a source apparatus adding additional constitutional elements to the aforementioned source apparatus 100.

Referring to FIG. 6, the source apparatus 600 may include a transceiver 610, a control signal generator 620, a controller 630, a decoder 640 and a loader 650.

The transceiver 610, the control signal generator 620, and the controller 630 may perform the same functions as the elements having the same names of the aforementioned source apparatus 400, as illustrated in FIG. 4, and thus the repeated explanation will be omitted.

The loader 640 may load content from a USB or a Blue-ray disk. The loader 640 may include a buffering means because it may have a slow read speed of the content. For the loaded data content, subtitle filtering may be performed.

The decoder 640 may decode the data content. Particularly, when loading is performed from the disk; a video frame is generated based on the video data. The video frame is generated in the form that can be easily transmitted to the sink apparatus.

Further, in an exemplary embodiment of a BDP source apparatus as shown in FIG. 2, when a disk is inserted into the apparatus, the loader 650 loads raw data of the content from the disk, and the decoder 640 decodes the raw data and generates content to be transmitted. During this process, content may be packetized. These processes are performed under the control of the controller 630.

Hereinafter, configuration and operation of one or more exemplary embodiments of a sink apparatus will be explained.

Figure 7:
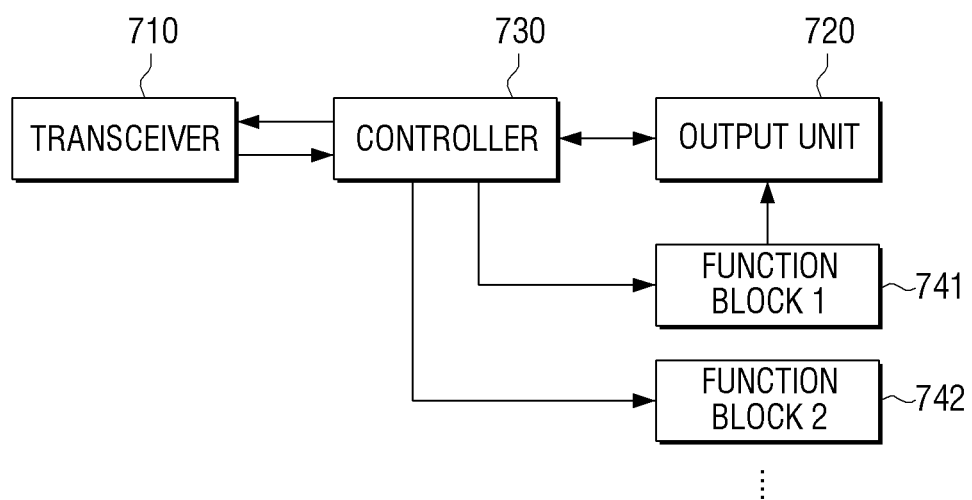
FIG. 7 is a block diagram illustrating a sink apparatus according to an exemplary embodiment.

FIG. 7 is a block diagram illustrating a sink apparatus 700 according to an exemplary embodiment.

Referring to FIG. 7, the sink apparatus 700 according to an exemplary embodiment may include a transceiver 710, an output unit 720 and a controller 730.

In accordance with one or more exemplary embodiments, the transceiver 710 transmits specification information of the sink apparatus 700 to a source apparatus and in return may receive content and a function block control signal from a source apparatus, e.g., the source apparatus 110, 210, 310, 400, or 600 from FIGS. 1, 2, 3, 4, and 6, respectively. Procedurally, the specification information of the sink apparatus 700 is read and analyzed by the source apparatus, where the sink apparatus 700 substantially transmit the signal indicative of the specification information to the source apparatus.

As set forth above, when the source apparatus is physically connected to the sink apparatus 700, the sink apparatus 700 may supply a voltage of 2.4V or more through a Hot-Plug-Detect pin (HPD) to the source apparatus. The sink apparatus 700 may perform an initialization (reset) and transmit a signal indicative of the specification information of the sink apparatus 700 to the source apparatus. The sink apparatus 700 as well as the source apparatus may also perform signal adjustment. The signal adjustment is related to pre-emphasis gain or transition minimized differential signaling (TMDS) voltage swing adjustment.

In an exemplary embodiment, the specification information may be included in an extended display identification data (EDID) block or a vendor-specific data block (VSDB) of the sink apparatus 700. Alternatively, a new data block may be defined and used in a reserved area. The specification information may be stored in a separate memory space that the source apparatus 600 can access during the initial connection stage.

The transceiver 710 may receive content from the source apparatus. The content may include various kinds of content such as audio content, 3D image content, 2-D image content and game content. Namely, any kinds of contents may be included.

Data content may be received using transition minimized differential signaling (TMDS). The TMDS is a data transmission scheme for transmitting images, audio, and other data using one of three modes; "image data period," "data island period" and "control period." In the "image data period," the image data is transmitted. In the "data island period," audio and other data are divided into various packets and transmitted. In the "control period," control signals are transmitted between the "image data period" and the "data island period."

The data content may be received starting from the time when the data enable signal is allowed, and may be received by being encoded using a high-bandwidth digital content protection technology. In addition, the data content may be synchronized with a function block control signal and received by the sink apparatus 700. The sink apparatus 700 may perform decoding using a key shared with the source apparatus and outputs the data content.

The transceiver 710 receives the aforementioned function block control signal from the source apparatus. The function block signal is generated by the source apparatus based on the specification information and the output properties of the data content. The specification information may include function blocks of the sink apparatus 700 and information on the control signal for each function block. The output properties of the content may be information which sets out the overall context in which the content is played back. For example, an output property may be any one of the kind (encoding type) of content, playing time, power consumption, information on a function block for playing back content, and whether an operation of another function block is required. For example, in the case of audio content, it may be unnecessary to play back video, and thus it is important to identify that the content is audio signals. Alternatively, even in the case of audio content, if the audio is a sound associated with an image or video signal, it may be requested and thus necessary to output the audio with the image or video signal, and thus a video function block would be operated. In accordance with an exemplary embodiment, if the sink apparatus 700 is a mobile apparatus such as a tablet PC, the sink apparatus 700 may be sensitive to power consumption, and thus the playback time of the content may be considered. If the playback time is relatively short, it may be possible to not turn off some function blocks (for example, a function block, such as Wi-Fi, related to a communication module) essentially required for the sink apparatus. However, if the playback time is relatively long, the battery consumption may increase, and thus turning off some function blocks to avoid the battery consumption during the idle time might be executed.

In an exemplary embodiment, in response to audio signals being transmitted between video signals on, for example an HDMI interface, control of a function block as described above may be executed. Particularly, an audio clock frequency may not be separately transmitted, and the sink apparatus 700 may therefore reproduce an audio clock from the video clock. To this end, a video signal and an audio signal are transmitted together. When the sink apparatus 700 receives the audio signal and the video signal together, the sink apparatus may activate all circuits and backlight related to video output in addition to the audio portions. Accordingly, even if only audio output is required, unnecessary power consumption occurs on the part of the activated video circuits and backlight related areas. Accordingly, a function block control signal to disable a video function block may be transmitted so that the circuits and backlight related video output of the source apparatus 700 is disabled and power consumption may be reduced.

In an exemplary embodiment, the source apparatus may generate a control signal for the function block of the sink apparatus 700 by referring to the lookup table based on the specification information and the output property of the content of the sink apparatus 700. The control signal may include function block identification information, which is controlled by the sink apparatus 200, and a control signal for the identified function block.

The function block control signal may be received by the sink apparatus 700 by being included in the source product descriptor (SPD) info-frame. The SPD info-frame is defined as packet type 0×83 under the HDMI standard.

According to an exemplary embodiment, the output unit 720 outputs the received content. The output unit may include an image output unit and a voice output unit. In particular, the image output unit may be implemented using various display technologies such as an organic light emitting diodes (OLED) technology, a liquid crystal display panel (LCD panel) technology, a plasma display panel (PDP) technology, a vacuum fluorescent display (VFD) technology, a field emission display (FED) technology, and an electro luminescence display (ELD) technology. The display panel may be implemented as a light-emitting type, but this does not mean that a reflective display such as E-ink, P-ink, and photonic crystal is excluded. In addition, the display panel may be implemented as a flexible display or transparent display.

According to one or more exemplary embodiments, although they are not shown in the drawings, various elements for outputting the contents, i.e. a signal processor, a demultiplexer and a speaker may be included.

The controller 730 may control the operation of the sink apparatus 700. In particular, the transceiver 710 may receive content and a function block control signal, output the content, and control the operation of the sink apparatus 700 according to the function block control signal. Particularly, the controller 730 may decode the received content, control the decoded content to be output by the output unit 220, turn off the functions of some function blocks, and turn on the functions of the other function blocks. For example, as illustrated in the drawing, function block 1 741 and function block 2 742 may be selectively turned on or off.

The controller 730 may include hardware elements, such as a CPU and a cache memory, and software elements, such as an operating system and an application performing a certain objective. Control instructions for operating the software elements of the sink apparatus 700 according to the system clock are read by the memory, and electric signals are generated to operate each hardware element according to read control instructions.

In the exemplary embodiment of FIG. 2, the TV 220 transmits the EDID data block to the BDP 200 and receives and outputs content received from the BDP 200. The TV 220 receives a control instruction to turn off the video function block of the TV 220 and turns off the function of the video function block. As a result, and as illustrated in FIG. 5, other function blocks other than the audio function block (function unit) are in an off state (OFF: indicated as 0) and only the audio function block is in an on state (ON: indicated as 1).

Figure 8:
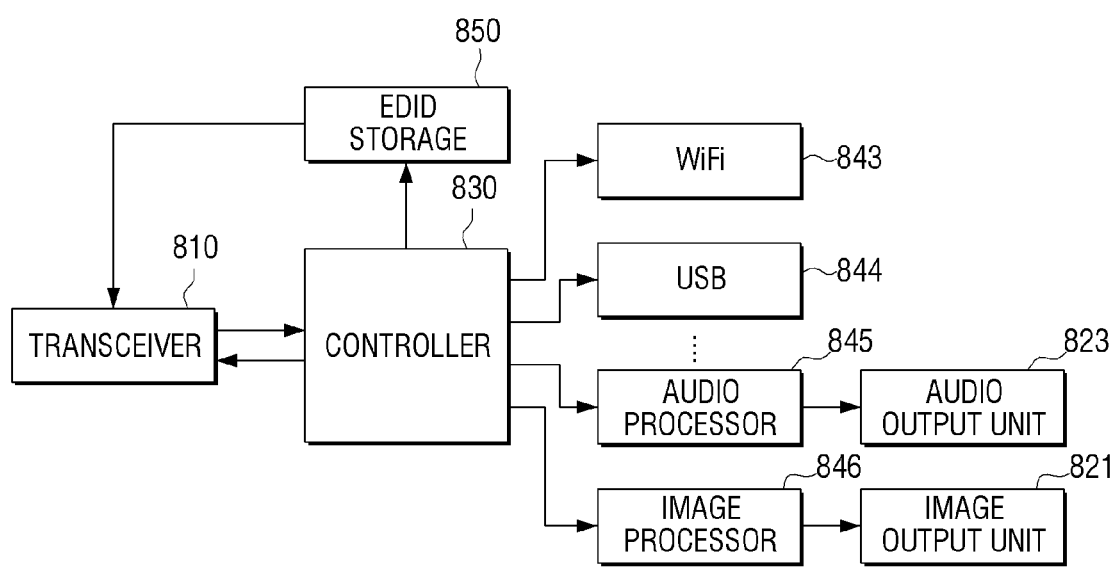
FIG. 8 is a block diagram illustrating a sink apparatus adding additional elements to the sink apparatus according to an exemplary embodiment.

FIG. 8 is a block diagram illustrating a sink apparatus with some additional elements being added to the sink apparatus 800.

Referring to FIG. 8, the sink apparatus 800, according to an exemplary embodiment, may include an EDID storage 850, a Wi-Fi function block 843, a USB function block 844, an audio processor 845, an audio output unit 823, an image processor 846, and an image output unit 821. The output unit 820 may include an audio processor 845, an audio output unit 823, an image processor 846, and an image output unit 821.

The EDID storage 850 stores therein the EDID data block, and the specification information of the sink apparatus 800. Further, according to an exemplary embodiment, the specification information may be included in the EDID data block and stored in the EDID storage 850. The EDID storage 850 may be a separate memory space which a source apparatus, e.g., the source apparatus 110, 210, 310, 400, or 600 from FIGS. 1, 2, 3, 4, and 6, respectively, can access during the initial stage. In accordance with another exemplary embodiment, and as set forth above, the specification information of the sink apparatus 800 may be included in the VSDB, or alternatively another data block may be defined.

Accordingly to one or more exemplary embodiments, the Wi-Fi function block 843 may be a function block capable of activating or sleeping a Wi-Fi function. A USB function block 844, may be a function block capable of activating or sleeping the function of various apparatuses through a USB connection and may include a USB dongle. The audio processor 845 and the audio output unit 823 are elements configured to output audio signals, and the image processor 846 and the image output unit 821 are elements configured to output image signals.

In accordance with one or more exemplary embodiments, various function blocks, which are not shown in the drawings, may be included. For example, an input function block, an analog input function block, an Ethernet input function block, a GPS function block, function blocks regarding various kinds of sensors (a proximity sensor, a touch sensor, a pressure sensor, etc.), a DMB function block, a Bluetooth function block, and an NFC function block may be included.

According to an exemplary embodiment, the aforementioned function block control system 300, illustrated in FIG. 3, may disable a function which is not used in the connected apparatus so as to reduce the power consumption, and may also reduce an interference so as not to influence the mutual operation, and thus electromagnetic waves such as EMI can also be attenuated.

Hereinafter, a source apparatus control method, a sink apparatus control method and a function block control method according to various exemplary embodiments will be explained.

Figure 9:
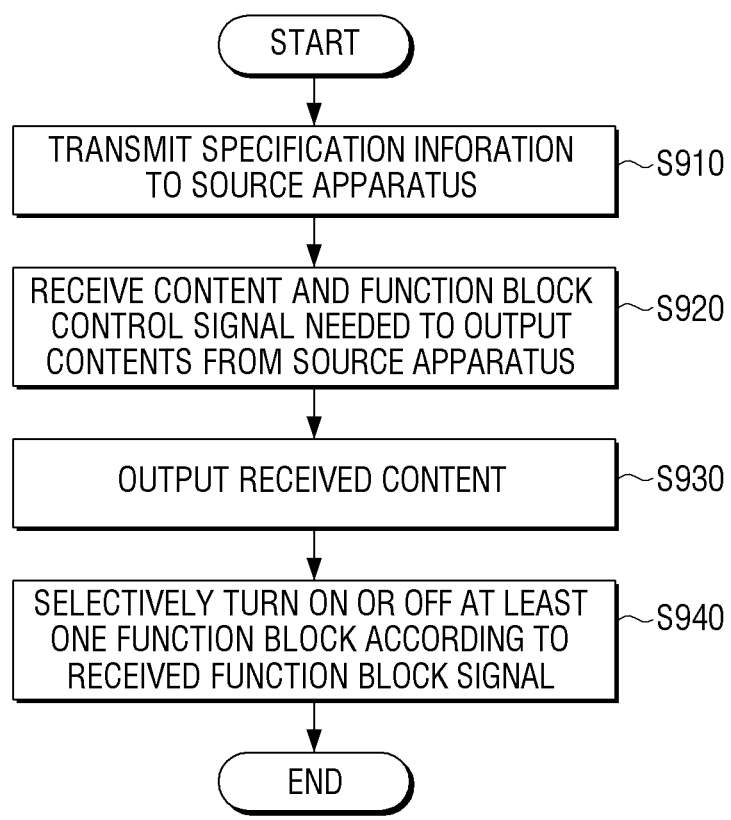
FIG. 9 is a flowchart illustrating a sink apparatus control method according to various exemplary embodiments.
Figure 10:
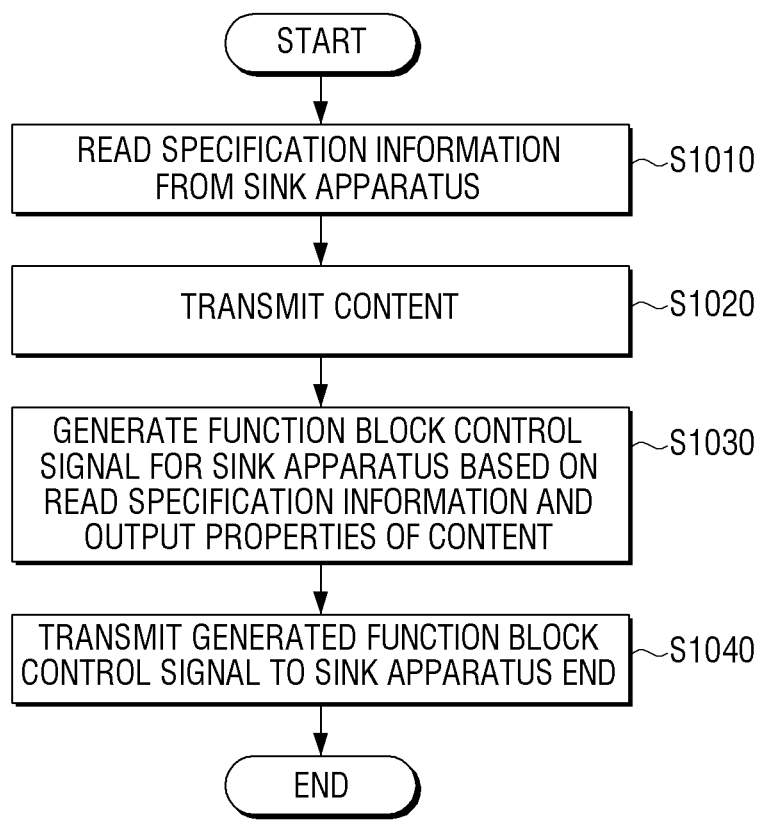
FIG. 10 is a flowchart illustrating a source apparatus control method according to various exemplary embodiments.

FIGS. 9-11 are flowcharts of a sink apparatus control method, a source apparatus control method and a function block control method according to various exemplary embodiments.

Referring to FIG. 9, the sink apparatus control method according to various exemplary embodiments may include the steps of transmitting the specification information of a sink apparatus to a source apparatus (S910); receiving content and a function block control signal related to an output of the content from the source apparatus (S920); outputting the received content (S930); and selectively turning on or off at least one function block according to the received function block control signal (S940).

According to an exemplary embodiment, the specification information of the sink apparatus may include information on the function block of the sink apparatus.

According to another exemplary embodiment, the specification information may be transmitted by being included in the extended display identification data (EDID).

The function block may be at least one of a Wi-Fi function block, a USB function block, an input function block, an analog input function block, an Ethernet input function block, an audio function block, a video function block, and a 3D function block.

Each step is similar to those explained in the aforementioned function block control system 300, illustrated in FIG. 3, and thus the repeated explanation will be omitted.

Referring to FIG. 10, the source apparatus control method according to various exemplary embodiments may include reading and analyzing specification information from a sink apparatus (S1010); transmitting content (S1020); generating a function block control signal for the sink apparatus based on the analyzed specification information and output properties of the content (S1030); and transmitting the generated function block control signal to the sink apparatus (S1040).

According to an exemplary embodiment, the function block control signal may be included in a source product descriptor (SPD) info-frame.

According to an exemplary embodiment, the function block control signal may be transmitted to the sink apparatus by being synchronized with the content.

According to an exemplary embodiment, when the transmitted content is audio content, the function block control signal may include a control signal turning off a video function block.

Referring to FIG. 11, the function block control method according to various exemplary embodiments may include reading and analyzing, by a source apparatus, specification information from a sink apparatus (S1110); generating, by the source apparatus, a function block control signal for the sink apparatus based on the read and analyzed specification information and output properties of the content (S1120); transmitting, by the source apparatus, the generated function block control signal and the content to the sink apparatus (S1130); and outputting, by the sink apparatus, the received content and selectively turning on or off at least one function block according to the received function block control signal (S1140).

According to another exemplary embodiment, the function block control method may be based on at least one of a HDMI transmission standard, a DVI transmission standard, and a MHL transmission standard.

Although a few exemplary embodiments have been shown and described, it will be appreciated by those skilled in the art that changes may be made in these exemplary embodiments. Particularly, the present teachings can be readily applied to other types of apparatuses and methods. Also, the description of the exemplary embodiments is intended to be illustrative, and not to limit the scope of the claims, and many alternatives, modifications, and variations will be apparent to those skilled in the art.

What is claimed is:

1. A sink apparatus including a plurality of function blocks, the sink apparatus comprising:
   a transceiver configured to receive content from a source apparatus; and
   a controller configured
      to transmit specification information regarding the plurality of function blocks included in the sink apparatus to the source apparatus via the transceiver;
      to receive control information for turning off at least one function block from among the plurality of function blocks from the source apparatus via the transceiver, the control information being information generated by the source apparatus based on the transmitted specification information and a characteristic of the content to be reproduced in the sink apparatus; and
      to turn off selectively at least one function block from among the plurality of function blocks of the sink apparatus based on the received control information while the content is reproduced in the sink apparatus.

2. The sink apparatus of claim 1, wherein the specification information related to the sink apparatus comprises information related to the at least one of the plurality of function blocks of the sink apparatus.

3. The sink apparatus of claim 1, wherein the specification information is transmitted by being included in extended display identification data (EDID).

4. The sink apparatus of claim 1, wherein the plurality of function blocks include at least two of a Wi-Fi function block, a USB function block, an input function block, an analog input function block, an Ethernet input function block, an audio function block, a video function block, and a three-dimensional (3D) function block.

5. A source apparatus comprising:
   a transceiver configured to receive specification information regarding a plurality of function blocks included in a sink apparatus from the sink apparatus and transmit content to the sink apparatus; and
   a controller configured to generate control information for turning off at least one function block from among the plurality of function blocks included in the sink apparatus based on the received specification information and a characteristic of the content to be reproduced in the sink apparatus so that the sink apparatus selectively turns off the at least one of the plurality of function blocks based on the control information while the content is reproduced in the sink apparatus, and control the transceiver to transmit the generated control information to the sink apparatus in response to receiving the specification information.

6. The source apparatus of claim 5, wherein the control information is included in a source product descriptor (SPD) info-frame.

7. The source apparatus of claim 5, wherein the control information is transmitted to the sink apparatus by being synchronized with the content.

8. The source apparatus of claim 5, wherein the control information comprises a control signal configured to turn off a video function block when the transmitted content is audio content.

9. A function block control system comprising:
   a source apparatus configured
      to generate control information based on specification information regarding a plurality of function blocks included in a sink apparatus and a characteristic of the content to be reproduced in the sink apparatus, the specification information being received from the sink apparatus, the control information for turning off at least one function block from among the plurality of function blocks;

to output properties of content to be transmitted; and
to transmit the generated control information and the content to the sink apparatus; and
the sink apparatus configured to receive the content from the source apparatus, transmit the specification information to the source apparatus via a transceiver, receive the control information from the source apparatus via the transceiver in response to transmitting the specification information, and selectively turn off at least one function block from among the plurality of function blocks of the sink apparatus based on the received control information while the content is reproduced in the sink apparatus.

10. The system of claim 9, wherein the function block control system is based on a HDMI transmission standard.

11. A method for controlling a sink apparatus, the method comprising:
receiving content from a source apparatus;
transmitting specification information regarding a plurality of function blocks included in the sink apparatus to the source apparatus via a transceiver;
receiving control information for turning off at least one function block from among the plurality of function blocks from the source apparatus via the transceiver, the control information being information generated by the source apparatus based on the transmitted specification information and a characteristic of the content to be reproduced in the sink apparatus; and
selectively turning off at least one function block from among the plurality of function blocks of the sink apparatus based on the received control information while the content is reproduced in the sink apparatus.

12. The method of claim 11, wherein the specification information related to the sink apparatus comprises information related to the at least one of the plurality of function blocks of the sink apparatus.

13. The method of claim 11, wherein the specification information is transmitted by being included in extended display identification data (EDID).

14. The method of claim 11, wherein the plurality of function blocks includes at least two of a function block, a USB function block, an input function block, an analog input function block, an Ethernet input function block, an audio function block, a video function block, and a three-dimensional (3D) function block.

15. A method for controlling a source apparatus, the method comprising:
analyzing specification information regarding a plurality of function blocks included in a sink apparatus, the specification information being received from the sink apparatus;
generating control information for turning off at least one function block from among the plurality of function blocks while content is reproduced in the sink apparatus, based on the analyzed specification information and a characteristic of the content; and
transmitting the content and the generated control information to the sink apparatus.

16. The method of claim 15, wherein the control information is included in a source product descriptor (SPD) infoframe.

17. The method of claim 15, wherein the control information is transmitted to the sink apparatus by being synchronized with the contents.

18. The method of claim 15, wherein the control information comprises a control signal turning off a video function block in response to the transmitted contents being audio content.

19. A method for controlling a function block, the method comprising:
analyzing, by a source apparatus, specification information regarding a plurality of function blocks included in a sink apparatus, the specification information being from the sink apparatus;
generating, by the source apparatus, control information for turning off at least one function block from among the plurality of function blocks based on the analyzed specification information and a characteristic of content to be reproduced in the sink apparatus;
transmitting, by the source apparatus, the generated control information and the content to the sink apparatus; and
selectively turning off, by the sink apparatus, at least one function block according to the received control information while the content is reproduced in the sink apparatus.

20. The method of claim 19, wherein the function block control method is based on at least one of a HDMI transmission standard, a DVI transmission standard, and a MHL transmission standard.

21. A sink apparatus comprising:
a plurality of function blocks configured to output content;
a transceiver configured to receive control information for turning off at least one function block from among the plurality of function blocks, the control information being information generated based on specification information regarding the plurality of function blocks of the sink apparatus and a characteristic of content to be reproduced in the sink apparatus and containing at least one off command for at least one of the plurality of function blocks; and
a controller configured to selectively turn off the at least one of the plurality of function blocks based on the received control information while the content is reproduced in the sink apparatus.

22. The sink apparatus of claim 1, wherein the plurality of function blocks comprise an input function block corresponding to an input function, a communication function block corresponding to a communication function, an audio function block corresponding to an audio function, and a video function block corresponding to a video function.

23. The sink apparatus of claim 1, wherein the plurality of function blocks are arranged in parallel such that only one function block is configured to be selectively turned off.

* * * * *